N. G. PERRY AND C. E. HULTING.
CLAMP.
APPLICATION FILED OCT. 11, 1918.
1,305,156.
Patented May 27, 1919.
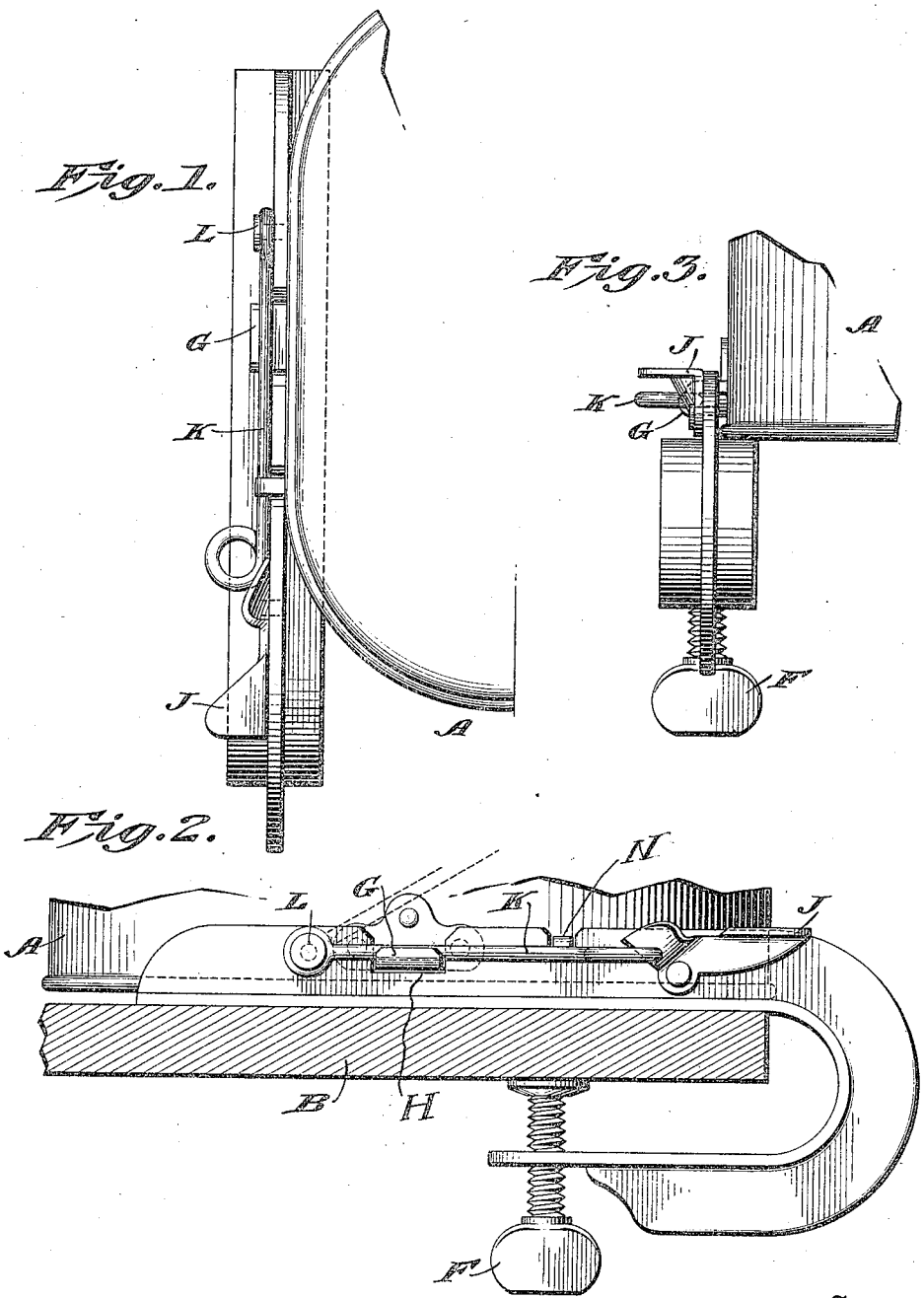

UNITED STATES PATENT OFFICE.

NATHAN G. PERRY AND CHARLES E. HULTING, OF DOUGLAS, ARIZONA, ASSIGNORS OF ONE-THIRD TO CHARLES X. THOMPSON, OF DOUGLAS, ARIZONA.

CLAMP.

1,305,156. Specification of Letters Patent. Patented May 27, 1919.

Application filed October 11, 1918. Serial No. 257,816.

*To all whom it may concern:*

Be it known that we, NATHAN G. PERRY and CHARLES E. HULTING, citizens of the United States, residing at Douglas, in the county of Cochise and State of Arizona, have invented certain new and useful Improvements in Clamps, of which the following is a specification.

This invention relates to an improvement in clamps particularly adapted for fastening a canteen to the running-board of a vehicle, such as an automobile.

In the accompanying drawings:

Figure 1 is a top plan view;

Fig. 2 is a fragmentary view from one end;

Fig. 3 is a fragmentary view from the front, showing one end of the canteen clamped to the running-board.

A, represents a canteen, and B, is the running-board of an automobile.

The clamp is preferably made of T-iron bent approximately into U-shape, as shown in Fig. 2, having a screw F for fastening it to the running-board from beneath.

The canteen has a hook G on either end, and the clamp is provided with a notch H adapted to receive the hook. A spring K is pivoted by means of a stud L to the clamp in position to swing over and into the hook G, while its outer end passes under a stop N projecting outwardly from the body portion of the clamp. As a means for releasing the spring K, a spring-release J is also pivoted to the clamp in position to engage the free end of the spring K in such a manner as to force it laterally or out of engagement with the stop N when the release J is moved upwardly.

By this method, we are able to fasten the canteen to the running-board without marring the latter, or making it necessary to run bolts or screws through it. It enables the owner to change the position of the canteen upon the running-board to suit the requirements, as it requires but a moment to place or replace the clamp and canteen, the canteen resting on one of the flanges of the clamp as shown clearly in Fig. 2 against the central flange, while the hook G extends through the notch, and the spring K down into the hook embracing and holding the latter while the spring release J locks the hook in position.

It is understood, of course, there are a pair of these clamps, one for each end of the canteen.

We claim:

1. A clamp for canteens comprising a T-shaped bar bent into U-shape, having a screw at one end for holding it in position, the central flange provided with a notch adapted to receive a hook on the canteen, a spring pivoted to the central flange of the clamp and adapted to hold the hook in the notch, a stop projecting laterally from the clamp, under which the free end of the spring is received, and a spring release for forcing the spring laterally of the clamp.

2. A clamp for securing a canteen to the running-board of an automobile, composed of T-iron bent into U-shape having a screw at one end, a central flange notched to receive a hook or projection on the canteen, a spring pivoted to the central flange and adapted to swing over the hook or projection and hold it securely in the notch, a stop projecting laterally from the body portion of the clamp under which the outer free end of the spring is adapted to pass, and a spring-release pivoted to the clamp and adapted to engage the outer free end of the spring for moving it laterally from the clamp, thereby disengaging its outer end from the stop.

In testimony whereof we affix our signatures.

NATHAN G. PERRY.
CHARLES E. HULTING.

Copies of this patent may be obtained for five cents each, by addressing the "Commissioner of Patents, Washington, D. C."